June 26, 1934.  G. GASTRICH  1,964,462
SPECIMEN HOLDING DEVICE
Filed March 18, 1933  2 Sheets-Sheet 1
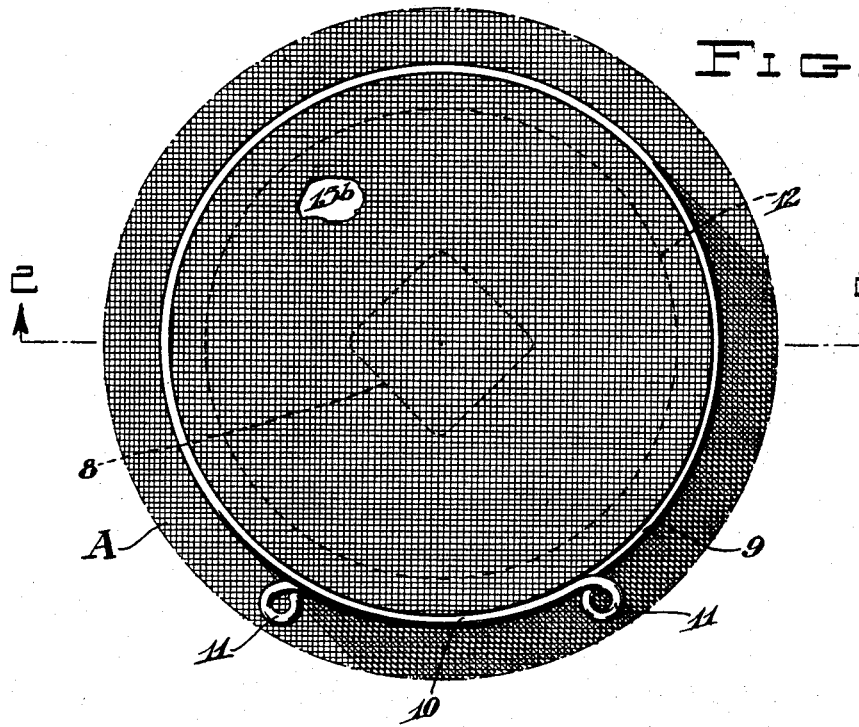
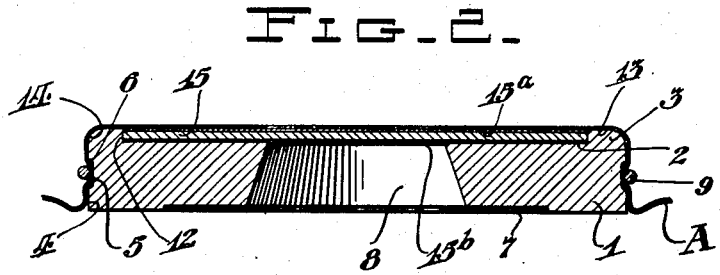
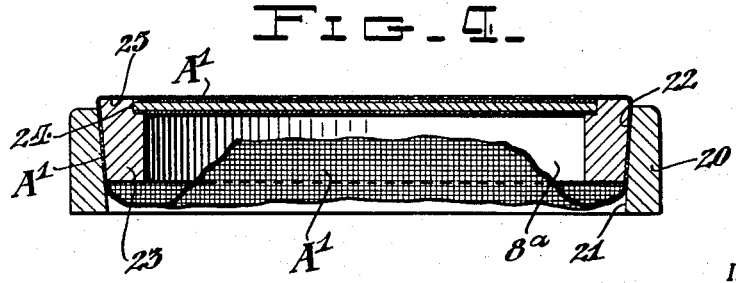
INVENTOR:
Gustav Gastrich,
BY Alfred E. Ichinger
ATTORNEY.

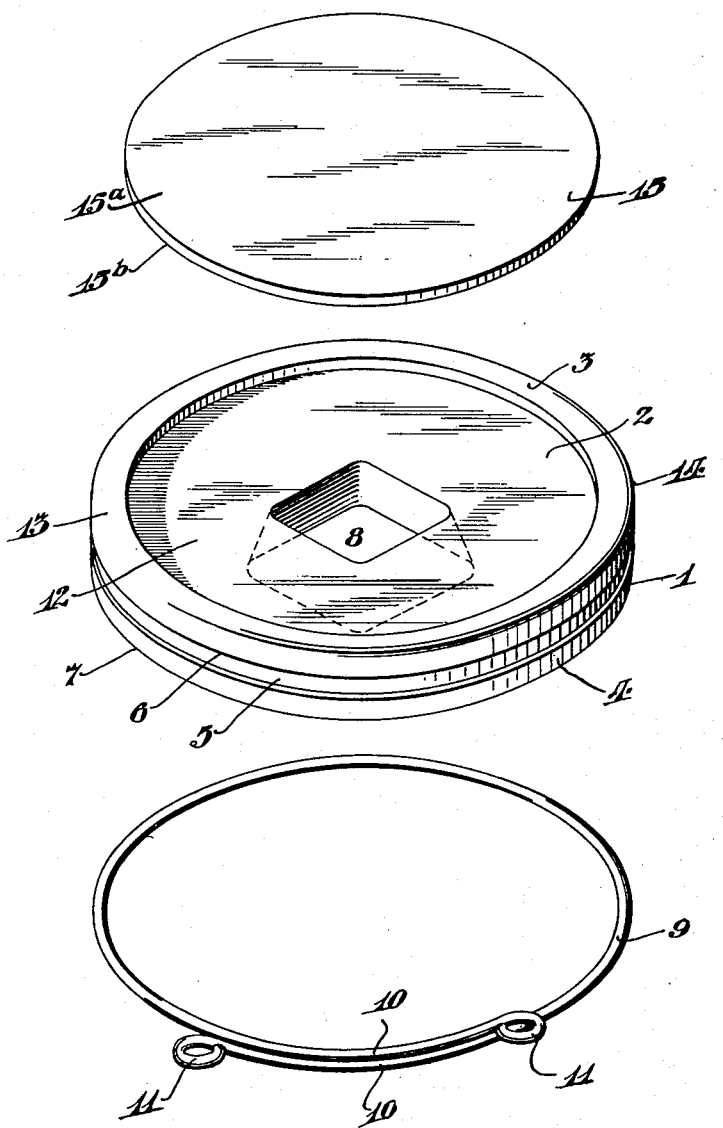

Patented June 26, 1934

1,964,462

UNITED STATES PATENT OFFICE 1,964,462

SPECIMEN-HOLDING DEVICE

Gustav Gastrich, Wyomissing, Pa., assignor to Textile Machine Works, Wyomissing, Pa., a corporation of Pennsylvania Application March 18, 1933, Serial No. 661,486

12 Claims. (Cl. 88—40)

This invention relates to an apparatus for use in displaying, examining and/or dissecting samples of normally flaccid sheet-like materials, such as textile fabrics and similar products.

An object of the present invention is to provide a device for maintaining a sizeable portion of an otherwise limp, normally contracted specimen, such as a woven or knitted swatch, in a flat, spread, relatively taut and uniformly tensioned condition, to facilitate inspection observation or reflected display of the specimen, or to assist in any other course of procedure to which the tightly stretched specimen may be subjected, as by leaving the hands of the person analyzing the specimen free for the manipulation of such implements as may be necessary to remove, spread or otherwise displace those of the threads or other elements of which the sample is composed in order to determine accurately the construction of the specimen.

Another object of the invention is to construct the specimen holder in such a manner that rays of light, from any convenient source, may be caused to project through the specimen mounted on the holder, when the specimen is of a transparent nature, or to impinge upon one face of the specimen, as desired.

Another object of the invention is to provide the holding device with a suitable background for, and preferably in contrast to the specimen, for the purpose of accentuating the construction of the specimen stretched over such background.

Another object of the invention is to construct the device in such a manner that the element affording the background for the specimen will also function as a suitable support for the specimen within the field of observation.

Another object of the invention is to construct the main portion of the device and the supporting background elements in such a manner that the last mentioned elements will be readily removable from and interchangeable in and with respect to the main structure, in order that a properly contrasting background may be provided for a specimen of any given color that may be placed in the holder.

The device made in accordance with the principles of the present invention is adaptable for use alone, or with a single or binocular microscope of any conventional type, such as are commonly used to obtain magnification of specimens of the types above noted, or with an apparatus capable of projecting an enlarged image of the specimen on a suitable screen.

With these and other objects in view, which will become apparent from the following detailed description of the illustrative embodiments of the invention shown in the accompanying drawings, my invention resides in the novel devices, elements of construction and combination of parts in cooperative relationship, as hereinafter more particularly set forth in the claims.

Fig. 1 is a plan view of the assembled holder with a swatch maintained in position for observation thereon;

Fig. 2 is a sectional elevation taken on the line 2—2, Fig. 1;

Fig. 3 is a detached perspective view of the elements of the device shown in Figs. 1 and 2; and Fig. 4 is a view similar to Fig. 2, but showing a modification of the invention.

As shown in Figs. 1, 2 and 3, the device comprises a base or main structure 1, in the present instance circular in form but which obviously may be of any desired outline. Projecting above the flat top surface 2 of the base 1 is an annular rib or flange 3. In the peripheral surface 4 of the base 1 is formed a groove 5 providing an overhanging shoulder 6 for purposes hereinafter set forth. Formed in the base 1 and extending therethrough from the top surface 2 to the bottom surface 7 thereof is an opening 8.

Adapted to fit within the circumferential groove 5 formed in the peripheral surface 4 of the base 1 is a spring clip 9, the opposite ends 10, 10 of which are disposed in overlapping relation to each other. At their extremities, the overlapping ends 10, 10 of the spring clip or clamp member 9 are provided with finger grips 11, 11 respectively.

Adapted to fit in the circular depression 12, formed in the base 1 between the top surface 2 thereof and the top surface 13 of the annular rib 3, is a plate or disc 15, the thickness of which preferably is equal to the difference in elevation between the top surface 2 of the base 1 and the top surface 13 of the annular rib 3. The upper outer peripheral edge 14 of the rib 3 is smoothly curved and blends into the peripheral surface 4 of the base 1 and the top surface 13 of said rib.

Under certain conditions of use a specimen A is spread smoothly over the base structure 1 with the disc 15 and clip 9 removed, as in Fig. 3, said specimen resting on the upper surface 13 of the annular rib 3. The spring clip 9 is then placed over the specimen and aligned with the peripheral surface 4 of the base 1, after which the said spring clip is pressed downwardly, simultaneously, at all points around the base 1, until the said clip 9 snaps into the groove 5 under the annular shoulder 6 of said base, whereby the specimen will be spread out flatly under uniform tension over the entire area of the base 1, the said specimen being firmly gripped between the spring clip 9 and the base of an annular shoulder afforded by the groove 5, for maintaining the specimen in said uniformly tensioned relatively taut flat condition suspended above and spaced from the top surface 2 of the base 1, said specimen resting solely on the top surface 13 of the annular rib 3 which defines a predetermined area or field of observation.

With the specimen held in this manner rays of light may be passed through the opening 8 to the underside of, and, in event of the specimen being transparent, through the said specimen, whereby direct observation of the specimen may be made or whereby observation may be made through and by means of any suitable magnifying apparatus suspended in any suitable manner above the specimen as maintained by the said holder.

In other instances the disc 15 is placed in the cavity 12 in the top of the holder, prior to the placing of the specimen over the holder in the manner above noted, to provide a support and background for the specimen within the field of observation. For the purpose of providing suitable contrast between the specimen and the background afforded by the supporting disc or platform 15, within the field of observation, the opposite faces 15a and 15b respectively of said disc may be of different colors. For example, the surface 15a may be black while the surface 15b may be white, the surface 15a in such case being adapted for use with white or light shaded materials, to provide a suitable contrasting background for such material when superimposed upon the supporting platform. The surface 15b, being white or of a light shade, would provide a contrasting background for black and the other darker shades of materials.

When used in the manner above noted, with the disc 15 in place in the base 1, the light rays would impinge upon the exposed surface of the material and in a case of a relatively open fabric, such for example as sheer silk hosiery, such light rays would impinge upon the underlying contrasting background, causing the construction of the fabric to stand out clearly against the background.

With the specimen maintained in a taut uniformly tensioned state by the holder it will be quite obvious that the hands of a person intending to analyze or dissect the specimen so held would be free for the manipulation of any implements that may be necessary for relatively moving or separating component elements of the sample for accurately determining the construction of the specimen.

The device, as shown in Fig. 4, comprises an outer ring 20, which is provided with an inner downwardly converging or tapering surface 21. Between the tapering surface 21 of the ring 20 and a correspondingly tapered surface 22 of an inner ring 23 the edges of the specimen $A^1$ are adapted to be gripped. The inner ring 23, as shown in Fig. 4, provides a through opening 8a of relatively large area for purposes similar to the opening 8 in the structure of Figs. 1, 2 and 3.

The ring 23 is counterbored, as at 24, to receive the outer edges of the supporting disc 15 when desired, the upper surface of said disc, when in position within the ring 23, is substantially flush with the upper surface 25 of that portion of the ring 23 surrounding the counterbore 24 therein.

In applying the specimen $A^1$ to the device shown in Fig. 4, the said specimen is first manually stretched or spread out over the upper surface 25 of the ring 23, with or without the disc 15 therein, the marginal portions of said specimen being folded downwardly around the outer surface 22 of the ring 23, after which the assembly is placed within the outer ring 20. After application of the outer ring 20, the marginal portions of the specimen $A^1$ extending through the ring 20 may be pulled to tighten the main portion of the specimen over the upper surface 25 of the ring 23, to provide the above noted uniformly tensioned taut condition of the major portion of the specimen, whereupon, pressing of the ring 23 downwardly within the ring 20 will cause the cooperating tapering surfaces 21 and 22 of the rings 20 and 23 respectively to grip tightly and frictionally hold the specimen therebetween.

Either of the two forms of devices described above and shown in the attached drawings may be used in connection with a photo projector by omitting the disc 15 and interposing the holder with the specimen thereon between the source of light and the magnifying lenses of the projector, whereby an enlarged image of the sample will be shown on the screen upon which the light rays impinge.

Of course, the device specifically shown and described can be changed and modified in various ways without departing from the invention herein disclosed and hereinafter claimed.

I claim:

1. A specimen-examining device, for holding a layer of material to be examined, comprising a base structure having a seating portion and a clamping portion, a layer background element for disposition on said base structure and forming a layer-supporting surface, said background element having a portion for cooperatively fitting said seating portion, and means for cooperation with said clamping portion for holding a layer in position.

2. A specimen-examining device, for holding a layer of material to be examined, comprising an element having a background surface for the layer and portions constituting means for holding the element in position, a base structure for selectively receiving and supporting the element, means operating from the base in cooperation with said holding-portion means for releasably holding and determining the position of the element relative to the base, and means for holding the layer in position.

3. A specimen-examining device, for holding layers of material to be examined, comprising a layer-receiving portion, means for positioning, and selectively changing between, a plurality of background surfaces adapted to be alternately positioned for substantially contacting the layers at said receiving portion, and means for holding the layers in position.

4. A specimen-examining device, for holding a layer of material to be examined, comprising a base having a surface for removably seating a background element for the layer, a background element having a surface complemental to said seating surface on the base for seating thereon, and means for cooperation between the layer and the base for maintaining the layer in position contacting and holding the background element.

5. A specimen-holding device comprising a solid plate-like base structure of substantial thickness, having a specimen supporting surface disposed in a predetermined plane, means for clamping a fabric to the base, said base having an aperture therein comprising tapering side walls extending from one face to the other, the restricted end of said aperture being adjacent that portion of the fabric under observation.

6. A specimen-holding device comprising a base structure having a specimen-supporting surface disposed in a predetermined plane with a cavity extending in depressed relation to said plane over a predetermined area of said surface, means for stretching the specimen over the area of said cavity and the portions of said surface abutting the marginal edges of the cavity, and means seated in said cavity to form a background for the specimen, said means lying directly beneath and in contact with substantially the entire area of said specimen adjacent thereto.

7. A specimen-holding device comprising a base structure having a specimen-supporting surface disposed in a predetermined plane with a cavity extending in depressed relation to said plane over a predetermined area of said surface, means for stretching the specimen over the area of said cavity and the portions of said surface abutting the marginal edges of the cavity, and a readily removable element seated in said cavity and having a surface substantially flush with the first said surface for supporting and forming a background for said specimen.

8. A specimen-holding device comprising a base structure having a specimen-supporting surface disposed in a predetermined plane with a cavity extending in depressed relation to said plane over a predetermined area of said surface, means for stretching the specimen over the area of said cavity and the portions of said surface abutting the marginal edges of the cavity, and a readily removable and reversible element seated in said cavity with one of a pair of substantially parallel and differently colored surfaces directly underlying the specimen and substantially in contact therewith to form a contrasting background therefor.

9. A specimen-holding device comprising a base structure having a specimen-supporting surface disposed in a predetermined plane with a cavity extending in depressed relation to said plane over a predetermined area of said surface, means for stretching the specimen over the area of said cavity and the portions of said surface abutting the marginal edges of the cavity, and an interchangeable readily removable element seated in said cavity with one of a pair of substantially parallel differently colored surfaces substantially flush with the first said surface for supporting and forming a contrasting background for said specimen.

10. A specimen-holding device comprising a base structure having a specimen-supporting surface and walls forming an opening extending through said base structure, means for stretching the specimen over said surface across said opening, a readily removable element carried by the base structure in underlying relation to said specimen for closing said opening and providing a suitable background for the specimen, and a ledge in the wall of said opening in spaced relation to said surface for supporting said readily removable element, said element lying directly beneath and in contact with substantially the entire area of said specimen adjacent thereto.

11. A specimen-holding device comprising a base structure having a top surface, a rib projecting above and defining a predetermined area of said top surface for supporting the specimen in spaced relation to said top surface, means for stretching said specimen over the area defined by said rib, and an element disposed intermediate the said top surface and said specimen for providing a suitable background for said specimen, said element lying directly beneath and substantially in contact with said specimen.

12. A specimen-holding device comprising a pair of rings having correspondingly tapered surfaces holding a specimen in stretched position over one of said rings, an annular shoulder formed in the said one ring adjacent the specimen stretched thereover, and a disc seated on said shoulder in underlying relation to the stretched portion of the specimen.

GUSTAV GASTRICH.